April 4, 1961 H. CHAFETZ ET AL 2,978,473
DIBASIC ACID MANUFACTURE
Filed Sept. 30, 1958
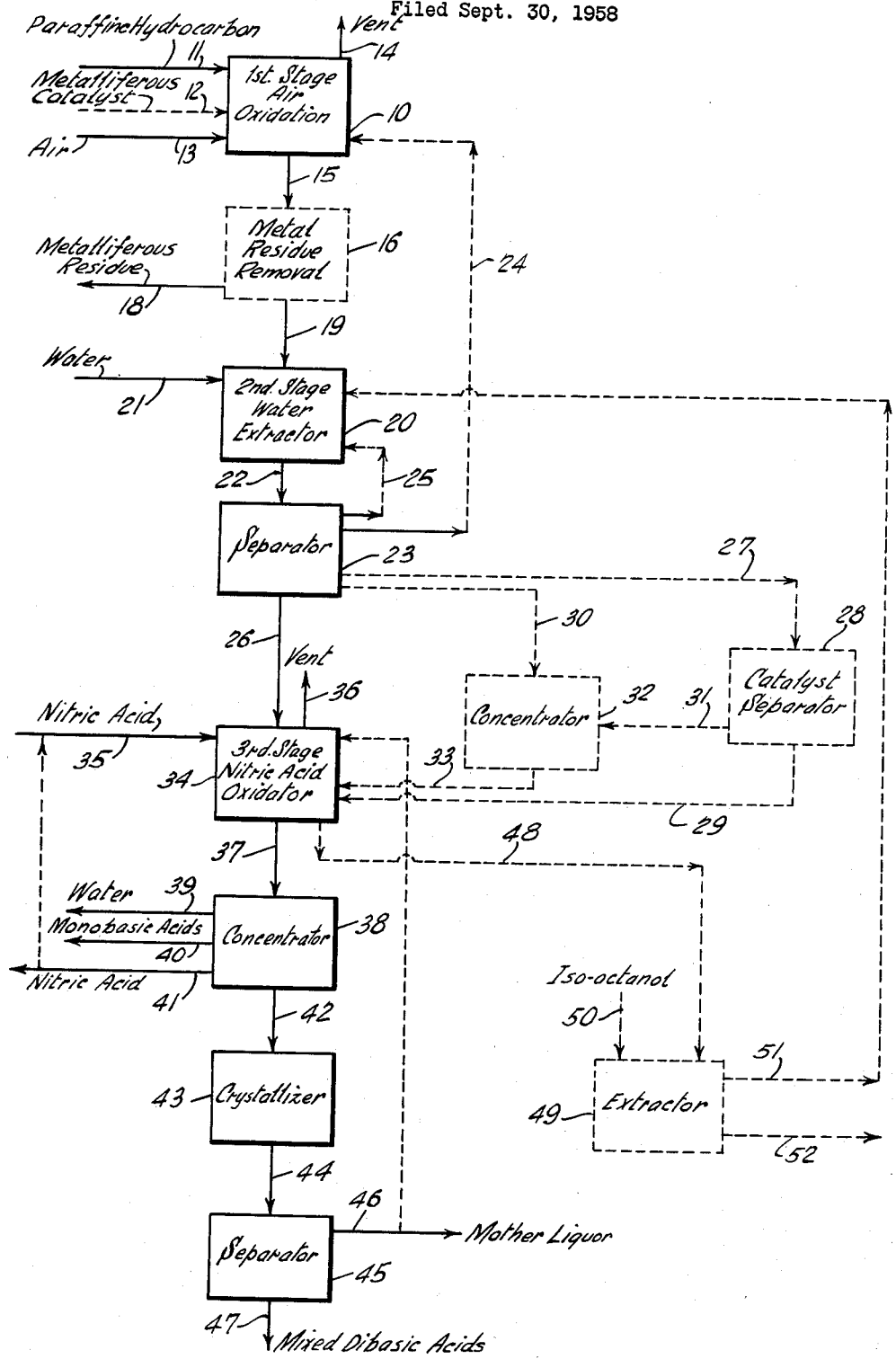

United States Patent Office 2,978,473
Patented Apr. 4, 1961

2,978,473

DIBASIC ACID MANUFACTURE

Harry Chafetz, Poughkeepsie, and John A. Patterson, Fishkill, N.Y., assignors to Texaco Inc., a corporation of Delaware Filed Sept. 30, 1958, Ser. No. 764,324

12 Claims. (Cl. 260—452)

This invention relates to a process for producing dibasic acids and more particularly to a process for their production from paraffinic hydrocarbons having a boiling point above 100° F. such as paraffin wax, slack wax and paraffinic lube oils.

The dibasic acids and their derivatives, e.g., succinic, glutaric, adipic, pimelic and higher acids are useful in the manufacture of oil additives, plastics, plasticizers, pharmaceuticals and synthetic lubricants. Esters of the higher molecular weight dibasic acids ($C_6+$) are particularly valuable as synthetic lubricants because of their low pour point and high viscosity index. The dibasic acids and their anhydrides are useful for the manufacture of alkyd resins with polyhydric alcohols. The acids may be converted also in a conventional manner to amides, metal soaps and the like.

In the oxidation of saturated aliphatic hydrocarbons, it has been known to employ nitric acid as the oxidizer. While the dibasic acids produced from such a process are satisfactory, the amount of nitric acid required per part dibasic acid produced is generally so large as to make the process commercially unattractive.

In the prior art there was developed a method of more effectively utilizing nitric acid in dibasic acid manufacture by first oxidizing aliphatic hydrocarbons with air in the presence of catalyst, subjecting the air oxidate to extraction with an alkanol or a dialkyl ketone extractant or selective solvent, stripping off the extractant and oxidizing the extraction residue with high strength nitric acid of a concentration above about 50%, preferably 70%. Although this method significantly reduces the consumption of nitric acid per part of dibasic acid produced, it has the major disadvantage of requiring the utilization of nitric acid having a concentration of at least 50% in order to obtain a reasonably low nitric acid consumption. Such high strength nitric acid has the greater disadvantage of being able to trigger and sustain explosions. In addition, high strength nitric acid is difficult to control reactionwise and is highly corrosive to reaction apparatus. Besides the disadvantage of employing high strength acid, the prior art method requires the stripping off of the alkanol or ketone selective solvent prior to nitric acid oxidation. Such a stripping operation substantially adds to the cost of production.

As an improvement over the prior art, we have devised a novel method of producing dibasic acids whereby the stripping off of the extractant is not required, prior to nitric acid oxidation; and whereby dilute nitric acid (less than about 40%) renders a better utilization of the nitric acid values than the concentrated acid (greater than about 50%); and whereby the more dilute the nitric acid the lower the acid consumption per part dibasic acid produced.

Broadly, our process for the production of dibasic acids comprises subjecting a paraffinic oxidate to water extraction, separating the aqueous phase from the oily raffinate, reacting the aqueous phase with dilute nitric acid thereby further oxidizing the water soluble paraffinic oxidates to dibasic acids, and recovering the dibasic acids from the aqueous phase.

This process is a low cost, rapid and efficient method for obtaining dibasic acids. In addition, it utilizes nitric acid to a degree of efficiency and economy unknown before in the prior art.

FIRST STAGE—OXIDATION WITH OXYGEN

In the first stage of our process, the oxidizing medium employed is elemental oxygen either in pure form or in a mixture of other gases, e.g., air. It is of paramount importance that the gas oxidation be carried on in a manner to obtain an oxidate product having a saponification number of at least 200, advantageously 300 to 600, and preferably between 400 and 600. Before the water extraction and nitric acid oxidation steps, saponification number is determined by the procedure set forth in ASTM Method of Test, D94–56T. This control contributes in part to the high yield of dibasic acids obtained and the ease of purifying the final dibasic acid product. The ease of purification is perhaps due to the stripping out of light ends such as low molecular weight monobasic acids, etc., by extensive gas oxidation prior to the water extraction and nitric acid treatment.

A preferred charge for the initial molecular oxygen oxidation (preparatory to water extraction) is macrocrystalline paraffin wax. Macrocrystalline paraffin wax is predominantly a straight chain saturated hydrocarbon having from 18 to 32 carbons atoms per molecule. Good yields of white crystalline dibasic acids were obtained with a semi-refined deoiled paraffin wax containing as little as 0.5% oil, a crude scale wax containing somewhat under 5% oil and wax concentrate having between about 5 and 40% oil content. The latter wax, a relatively high oil content wax, is termed "slack wax" in the trade.

The primary oxidation is conducted in any conventional manner permitting attainment of the necessary high saponification number. Suitable oxidation of slack wax for use in our process can be done in accordance with the procedure described in U.S. Patent No. 2,847,439. The less oily wax, such as deoiled paraffin wax, obtained by solvent dewaxing a distillate oil, pressing and sweating a distillate oil, or a combination process of extractive solvent refining, can be oxidized to the needed high saponification number with an oxygen-containing gas according to the process disclosed in co-pending, co-assigned application, Serial No. 492,746, filed March 7, 1955, now U.S. Patent No. 2,862,803.

Highly oxidized wax oxidates produced from paraffin wax containing less than 5% oil by use of the latter process to obtain neutralization-saponification number ratios above about 0.6 are a preferred oxidate charge stock for use in our invention. In such operations the deoiled paraffin wax is reacted with air with or without the presence of a metalliferous catalyst at a temperature between about 230 and 360° F. and a pressure of 30 to 300 p.s.i.g., employing an air feed of about 10 to 50 cu. ft. per hr. per lb. of paraffin wax charge, and a superficial air velocity in the reactor between about 0.25 and 1.0 feet/second. By superficial velocity of air feed we mean the quotient of the expression (cu. ft. per second of air feed measured at 60° F. and reactor inlet pressure÷cross section normal to air flow of the empty reactor in sq. ft.). The product of air oxidation is an exceedingly complex mixture of carboxylic acids, ketones, esters, alcohols, aldehydes, lactones, etc. The preceding air oxidation process for deoiled wax is equally applicable for paraffinic lube oils.

The common metalliferous catalysts used in air oxidation are such polyvalent metal compounds as naphthenates, stearates, organic acids and the like. Such compounds of manganese, chromium, vanadium, calcium, zinc, lead, titanium, mercury and cerium are useful catalysts. For example, in the air oxidation of paraffin wax, potassium permanganate is the preferred catalyst and it is employed in amounts ranging from 0.1 to 1% of the total wax charge, preferably about 0.4% and is dispersed in the wax as a water solution (which distributes the permanganate uniformly during the air oxidation). Alternatively, oxides such as manganese dioxide, zinc oxide and the like can be used.

SECOND STAGE—WATER EXTRACTION

In the second stage of our process the air oxidized product is heated and mixed with water at a temperature between about 100 and 500° F. preferably between 150 and 350° F. The pressure under which this second stage extraction is conducted depends upon the extraction temperature. The pressure must be sufficient to maintain the extractant water in the liquid phase. For example, for extraction temperatures of about 212° F. and below, atmospheric pressure will suffice while the temperatures on the order of 300° F. will require pressure of about 50 p.s.i.g. The pressure in the extraction step can either be autogenous or supplied from an outside compressed gas source. Pressures above about 1000 p.s.i.g. are generally not required. The weight ratio of water to air oxidation product is not critical and can be varied over a wide range, from 0.1:1 to about 10:1 with a weight ratio between about 1:1 and 4:1 preferred. In the extraction process, the oxidate-water mixture is preferably agitated for a period of about 1 hour. After agitation the mixture is allowed to stand until phase separation is essentially complete. This varies from a few minutes to a few hours depending on the extraction temperature, degree of agitation, amount and type of materials employed. The lower phase contains most of the water and acidic materials (which phase is designated as aqueous phase for convenience), and the supernatent phase contains unreacted paraffins, various lipophilic substances, high molecular weight esters and the like (which phase we have deemed the "oily phase" for convenience). These phases can be separated by simple decantation, siphoning off, or gravity separation of one of the layers. While simple gravity separation is preferred in this step of our process, accelerated separation by means of a centrifuge or the like is also possible. The oily phase is preferably recycled to the air oxidation step as hereinbefore described. Before such recycling, the oily phase can be further extracted with water to recover additional quantities of acidic material and the water solution then combined with the first obtained aqueous phase.

THIRD STAGE—NITRIC ACID OXIDATION

The final stage of our process is the dilute nitric acid oxidation of the water extract obtained from the previously described water extraction step. The nitric acid strength should be between about 5 and 40%, preferably between 15 and 40% based on the total weight of $HNO_3$ and water in the reaction mixture. Within this range we have found, contrary to the teachings of the prior art, that the nitric acid consumption per part dibasic acid produced is substantially lower when nitric acid of a concentration of less than about 40% is employed than when concentrated nitric acid is employed, e.g. 70%. The temperature of the nitric acid oxidation can be maintained between about 120 and 400° F., preferably between 150 and 350° F. The reaction is operated at a pressure from about atmospheric to 800 p.s.i.g. The superatmospheric pressures are required when the reaction is conducted at temperatures above the boiling point of water to maintain a substantial portion of the water and other reactants in the liquid phase. Thorough agitation of the reaction mixture is desirable.

The nitric acid oxidation can be run batchwise or continuously, advantageously by incrementally (continuously or at intervals) adding the wax oxidate and nitric acid to a reactor wherefrom the product mixture is withdrawn, also incrementally to keep the volume of the reactor essentially constant.

The resulting product mixture from the nitric acid oxidation is generally homogeneous, although if the water extraction step has been conducted at the high end of the extraction temperature range an oily layer may appear. This oily layer, which is normally the upper layer, can be separated by any of the conventional means, e.g. gravity separation and recycled to the first stage of the process. The aqueous layer primarily comprises dibasic acids and water.

Generally we prefer to concentrate the separated aqueous layer by distillation under reduced pressure before attempting to make the ultimate recovery of dibasic acids. The aqueous layer is fractionally distilled, preferably below about 300 mm. Hg absolute pressure and vapors comprising water and lower molecular weight monobasic acids are taken off as distillate. The unreacted nitric acid can also be distilled off, e.g. as a nitric acid-water azeotrope but it is preferred to arrest concentration when the nitric acid-water azeotropic boiling temperature is indicated at the still head.

Alternatively, prior to concentration by distillation or vaporization, it is advantageous to extract the separated aqueous phase with a higher alkanol of 4 to 18 carbon atoms, e.g., n-butanol, 2-ethylhexanol, n-decanol and preferably, isooctanol being used in about 1 to 4 volumes per volume of aqueous layer. By so doing, a major portion of the higher molecular weight dibasic acid ($C_8+$) are effectively extracted from the aqueous mixture by solution in alkanol along with a small quantity of nitric acid. The extract solution so formed can then be heated directly to cause the reaction of the alkanol with the dibasic acid, producing alkyl esters of the dibasic acids because the small amount of nitric acid in the extract solution acts as a catalyst for the esterification. Esters of high molecular weight dibasic acids have the greatest utility for use in synthetic lubricants.

Recovery of concentrated dibasic acids can be conveniently done by crystallizing them out of the high boiling concentrate of the aqueous phase obtained from the previously described fractional distillation. The still pot residue from such distillation is cooled to approximately 0° F., although higher and lower temperatures from about 40° to about —40° F. can be employed. A magma of mixed dibasic acid crystals is obtained and filtered. The filtrate, a mixture of dibasic acids and concentrated nitric acid can be recycled to the nitric acid oxidation reactor because the dibasic acids therein are reasonably stable toward oxidation. Alternatively, the filtrate can be concentrated by redistillation and additional dibasic acids recovered from the resulting concentrate by recrystallization. This procedure can be repeated as many times as desired for the recovery of additional dibasic acid values, not over four times being the general practice.

The mixed dibasic acid crystals can be purified by distillation, sublimation or treating with a variety of solvent-solid adsorbent systems such as by redissolving in acetone, ethyl acetate, water or chloroform, contacting the solution with activated charcoal, silica gel, adsorptive clay or the like, separating the solid and recrystallizing. Concentrates preponderating in specific dibasic acids can be made by column partition chromatography, e.g. by placing the mixed acids in an aqueous solution or a column of moist silica gel and washing through with chloroform-butanol mixtures containing increasing proportions of the alcohol, the acids being selected in reverse order to their molecular weight; or by the method described in U.S. Patent 2,716,133 utilizing a fractional crystallization from halogenated solvents such as dichlorobenzene.

Weight proportion of specific dibasic acids in the crystalline mixture obtained from crystallizing the aqueous bottom concentrates is approximately as follows:

20 to 55% succinic ($C_4$), 10 to 30% glutaric ($C_5$), 10 to 25% adipic ($C_6$), 5 to 15% pimelic ($C_7$), 5 to 15% suberic ($C_8$) and azelaic ($C_9$), and the remainder of the dibasic acids being of a higher molecular weight.

When in the oxygen gas oxidation step, i.e., the first stage of our process, metalliferous catalyst has been employed, it is desirable to remove the catalyst prior to the third stage nitric acid oxidation if increased yield of the higher molecular weight ($C_6+$) dibasic acid is to be obtained. The higher molecular weight dibasic acids have the aforementioned special utility for synthetic lubricants and the like. The oxidate which has been produced by oxidation with a gas such as air in the presence of a polyvalent metal catalyst can be simply filtered or treated with a cation exchange resin such as Amberlite IR-120 (the trade name for a styrene base sulfonic acid cation exchange resin made by the sulfonation of the copolymer of styrene and divinylbenzene and manufactured by the Rohm and Hass Co.) or Dowex 50 (the trade name of a similar styrene base sulfonic acid cation exchange resin made by the Dow Chemical Co.). Suitable cation exchanges are described, for example, in U.S. Patent 2,736,741. Other conventional methods of separation may, of course, be employed.

An alternative aspect of our invention is the use of a specific catalyst combination in our nitric acid oxidation step, i.e., the third stage, in order to have the nitric acid oxidation favor production of the lower molecular weight dibasic acids such as succinic and glutaric acid. We have found that between 0.05 and 3% powdered metallic copper (i.e. a fineness >50 mesh, U.S. Standard) and between 0.05 and 3% of a vanadate selected from the group consisting of alkali metal vanadate and ammonium vanadate substantially increases the yield of succinic acid. The aforementioned percent quantities of catalyst are based on the weight of the water soluble oxidate in the nitric acid oxidation step. The catalyst components are preferably pre-mixed before adding to the nitric acid reactor. Separation of the catalyst from the final product can be accomplished by conventional methods, e.g. ion exchange.

Our novel process can be more fully understood by referring to the single figure of the drawing, which is a flow sheet of the process. In the drawing, paraffinic hydrocarbon in a liquid state is charged to first stage air oxidation reactor 10 through line 11. Such a hydrocarbon can be a paraffin wax obtained by solvent dewaxing a paraffin wax distillate. If the nature of the charge hydrocarbon is such as to require the presence of catalyst during the first stage oxidation, metalliferous catalyst such as an aqueous solution of potassium permanganate can also be charged to reactor 10 through line 12. Air is introduced through line 13 and bubbles up through the charge. The reaction mixture is heated rapidly to a temperature of about 340° F. and then maintained in a control range by indirect heat transfer with submerged coils of heat exchange fluid. After about 1 to 13 hours depending on particular reaction conditions and charge material, there is obtained a paraffin hydrocarbon oxidate having a saponification number above 200, generally approaching 500. This oxidate is withdrawn from reactor 10 by line 15.

At this stage the oxidate can be sent directly to the water extraction vessel 20 or optionally, if metalliferous catalyst is present and metal residue removal is desired, fed to vessel 16 and there filtered. The metalliferous residue is withdrawn from the system through line 18. In lieu of such filtration, it is also possible to use sequestration, ion exchange removal, chelation or precipitation of the metalliferous residue. The so treated wax oxidate is then passed through line 19 into a second stage extraction reactor 20 wherein it is vigorously agitated with water at a temperature and pressure in the ranges as heretofore described. The water is introduced into extractor 20 through line 21. The average residence time of the reaction mixture in vessel 20 should be at least several minutes and need not be longer than 2 to 3 hours depending upon the degree of extraction desired. The extraction mixture in vessel 20 is passed through line 22 into gravity separator 23 (e.g. a tank) wherein a lower aqueous phase and a supernatant oily phase are formed. The oily phase is withdrawn from separator 23 and can be recycled to the first oxidation vessel 10 by means of line 24, or to the second stage extraction vessel by means of line 25. The aqueous extraction phase is withdrawn from separator 23 and can be sent directly to the nitric acid oxidator 34 through line 26. Alternatively, if catalyst has not been removed in the air oxidation stage and removal is desired, for reasons of product purity, the aqueous extract can be sent to metal residue separator 28 through line 27. Separator 28 can be any conventional device for the removal of dissolved and undissolved catalyst, e.g. an ion exchange column. In addition, if desired, concentration of the aqueous extraction phase can be accomplished by sending the aqueous phase through lines 30 or 31 to concentrator apparatus 32, e.g. comprising a kettle, distillation column, still head, condenser, auxiliary line and controls.

In any case, the aqueous extract, decatalyzed aqueous extract or distillation residue is withdrawn through line 26, line 29 or line 33 respectively into nitric acid oxidation vessel 34. Nitric acid is fed into vessel 34 through line 35, the concentration of the acid being adjusted so that the final nitric acid concentration in oxidation vessel 34 will be between about 5 and 40% based on the total weight of 100% $HNO_3$ and water in the reaction mixture. During the third stage of nitric acid oxidation it is preferable to agitate the oxidation mixture, the pressure and temperature in this stage being regulated within the ranges hereinbefore described. The average residence time of the reaction mixture in vessel 34 should be at least 10 minutes and no longer than 4 hours. By-product gases, e.g., carbon dioxide, nitrogen, nitric oxide, nitrogen dioxide and nitrous oxide are vented from line 36. Nitrous gases of nitric oxide or nitrogen in a higher stage of oxidation can be recovered and converted to additional nitric acid in a conventional fashion.

The reaction mixture is then withdrawn through line 37 and sent to apparatus 38 for concentration of the dibasic acid product. Any conventional apparatus may be employed, e.g. a fractional distillation apparatus comprising a kettle, distilling column, still head, condenser, auxiliary lines and controls. Low boiling materials such as water, monobasic acids and nitric acids are withdrawn from the still head in a conventional manner and sent to tankage through lines 39, 40 and 41, respectively. The recovered nitric acid can be utilized in oxidation vessel 34. Preferably, when the nitric acid-water azeotrope (68% $HNO_3$—32% $H_2O$) boiling temperature (249° F. at 760 mm. Hg) occurs during distillation, concentration is arrested and the still bottoms are passed through line 42 into crystallizer 43, wherein the still bottoms are cooled to about 0° F. Optionally, before cooling nitric acid traces can be removed by treatment of the still bottoms with a weakly basic ion exchange resin, e.g., the kind described in U.S. Patent 2,689,832. Alternatively, much or all of the nitric acid traces can be precipitated with organic bases, e.g., quinoline, ortho or meta toluidine, "Nitron" (the trade name for 1,4-diphenyl-3,5-endanilo-4,5-dihydro-1,2,4-triazole), or the like, and the still bottoms filtered. After cooling there results a slurry of crystalline dibasic acids in mother liquor. This is passed through line 44 into separator 45, e.g., a filter. Mother liquor is withdrawn from line 46 and can be further concentrated, recrystallized and separated from retained dibasic acid values. However, the mother liquor is preferably recycled to vessel 34 through line 46 for nitric acid oxidation along with fresh water soluble paraffinic oxidate. Mixed dibasic acids are withdrawn from separator 45 by means of line 47 and may be further purified by distillation, sublimation or recrystallization from solvents, optionally after having been treated with a solid absorbent such as activated charcoal.

A further embodiment of our process includes withdrawing at least a portion of the aqueous phase from vessel 34 through line 48 into extractor 49. Herein a higher alkanol such as iso-octanol is admitted through line 50, thoroughly contacted with the aqueous material, and separated into a raffinate phase, which is withdrawn through line 51, and an extract solution phase which is withdrawn through line 52. The oily raffinate can be recycled to vessel 20 for further extraction. The extraction solution which is withdrawn through line 52 and which contains alkanol, dibasic acids and a small portion of nitric acid can be used directly as an esterification reaction mixture.

The material of construction for the air oxidation reactor is preferably aluminum or an austenitic stainless steel but also can be made of other corrosion resisting materials such as glass lined steel and the like. Corrosion resistant equipment such as austenitic stainless steel is preferred throughout. The intermittent storage facilities, pumps, valves and other auxiliary equipment have not been shown in the foregoing drawing but are provided wherever necessary or desirable.

The following examples show ways in which our invention has been practiced but are not to be construed as limiting the invention. Example I and Example III—Run 3 do not represent methods by which our invention is practiced but have been included for purposes of comparison. All parts and percentages heretofore and hereinafter recited are based on weight except as otherwise especially noted.

Example I

A petroleum oxidate was made by air blowing a semi-refined 125 to 127° F. melting point macrocrystalline paraffin wax in the presence of potassium permanganate catalyst. 50 parts of the oxidate having a neutralization number (Neut. No.) of 296, a saponification No. (Sap. No.) of 475, an unsaponifiable content of 5.7%, a hydroxyl No. of 5 and an iodine number of 3 were charged to a stainless steel steam heated autoclave together with 105 parts of concentrated (70.1%) nitric acid and 350 parts of water giving a final nitric acid concentration of 17% (based on $HNO_3$ and $H_2O$). Stirring was started and the autoclave was heated at between 300 and 320° F. for 2.5 hrs. during which time the pressure rose to 510 p.s.i.g. The reactor was cooled to room temperature and the resultant gases were bled off. The liquid product was blended with 100 parts by volume of chloroform and then siphoned from the reactor. The aqueous and organic layers were separated by gravity separation. The aqueous layer was passed through the hydrogen form of the sulfonated copolymer of styrene and divinylbenzene cation exchange resin (Amberlite IR 120) to remove any metallic cations and subsequently the crude dibasic acid crystals were separated from the aqueous phase by vacuum distilling off the water and nitric acid at a pressure of between 15 and 50 mm. Hg absolute employing a boiling water (212° F.) bath. The yield of residuum dibasic acid crystals was 30.5 parts equivalent to 61% of the wax oxidate charge. These crystals had a Neut. No. of 812 and by liquid liquid-partition chromatography were shown to contain 29% succinic acid, 23% glutaric acid, 13% adipic acid, 7.9% pimelic acid, 6.2% suberic and azelaic acid and 20.9% dibasic acids having more than 9 carbon atoms. Taking into account the amount of nitric acid recoverable, calculations found that the nitric acid consumption was 2.3 parts nitric acid (as 100%) per part of dibasic acid produced.

The chloroform extract was stripped of chloroform by heating the extract solution at 212° F. leaving a viscous dark oil having a Neut. No. of 427 amounting to 4 parts which is equivalent to 8% of the original oxidate charged.

In order to show the remarkable decrease in the consumption of nitric acid in contrast to the non-water extraction process of Example I, the following typical example is presented.

Example II 500 parts of wax oxidate prepared by air blowing semi-refined 125 to 127° F. melting point macrocrystalline paraffin wax in the presence of potassium permanganate having a Neut. No. of 296, a Sap. No. of 475, an unsaponifiable content of 5.7, a hydroxyl No. of 5 and an iodine No. of 3 was charged to a stainless steel steam heated autoclave together with 500 parts of water. Stirring was started and the autoclave was heated at 300° F. for one hour during which time the pressure rose to 60 p.s.i.g. Subsequently, the reaction mixture was cooled and allowed to stand for 2 hours to permit the separation of the aqueous and organic layer. The lower aqueous phase was drawn off from a dip tube which extended into the bottom of the autoclave. The water extraction solution was found to contain 34.1 parts by weight of water soluble oxidate per 100 parts by volume of solution.

100 parts by volume of the aqueous extract together with 102 parts by volume of concentrated (70.1%) nitric acid and 384 parts by volume water were charged to a 3-neck Pyrex flask equipped with a stirrer, dropping funnel, thermometer and reflux condenser. The weight ratio of the water soluble oxidate/nitric acid (100%)/water was 1/3/15 thereby establishing a nitric acid concentration of 17% based on the $HNO_3$ and water. The reaction flask was heated at between 212–214° F. and the reaction mixture was stirred for a one hour period. A small portion of the reaction mixture was set aside for potentiometric titration to determine the unconsumed nitric acid.

The remainder of the reaction mixture was passed through an ion exchange column filled with the hydrogen form of Amberlite IR–120 ion exchange resin to remove any metallic cations and subsequently the crude dibasic acid crystals were removed from the aqueous phase by distilling off the water and residual nitric acid at a reduced pressure of between 15 and 50 mm. Hg absolute employing a boiling water (212° F.) bath. The yield of dibasic acid was 88% based on the water soluble oxidate fraction. The dibasic acid crystals had a Neut. No. of 699 and by liquid-liquid-partition chromatography were shown to contain 26% succinic acid, 14% glutaric acid, 13% adipic acid, 8.3% pimelic acid, 11.1% suberic acid and azelaic acid and 27.6% dibasic acid having greater than 9 carbon atoms. Taking into account the amount of nitric acid recoverable, it was found that nitric acid consumption amounted to 0.6 part nitric acid (as 100%) part of dibasic acid produced.

A comparison of the nitric acid consumption values in Examples I and II established that almost a 75% reduction in nitric consumption is obtained when the air oxidized wax product is extracted with water and further oxidized with dilute nitric acid.

While Examples I and II illustrate the remarkable saving in nitric acid when a water extraction step is inserted between the initial air oxidation and final nitric acid oxidation, the following example illustrates another surprising feature of our method, namely, the employment of very dilute nitric acid for the maximum utilization of said acid.

Example III

Three 100 part by volume portions of the aqueous extract solution phase of Example II were respectively oxidized in the manner described in Example II with nitric acid concentrations of 17%, 40% and 52% (based on $HNO_3$ and water). It was found that of these three acid concentrations, the 17% acid gave the lowest acid consumption per part of dibasic acid recovered with nitric acid concentrations of less than about 40% being satisfactory. This is shown in the following table:

TABLE I

|  | Run 1 | Run 2 | Run 3 |
| --- | --- | --- | --- |
| Reaction Conditions: |  |  |  |
| Aqueous extract phase, ml | 100 | 100 | 100 |
| Nitric Acid (70.1%) ml | 102 | 102 | 102 |
| Water, ml | 384 | 39 | 0 |
| Oxidation Temp., °F | 212-214 | 210-216 | 160-172 |
| Reaction Time, Hrs | 1 | 1 | 1 |
| Wt. Ratio by Water Soluble Oxidate/$HNO_3$/$H_2O$ | 1/3/15 | 1/2/4.5 | 1/4/3.7 |
| Nitric Acid Conc., Wt. Percent | 17 | 40 | 52 |
| Reaction Results: |  |  |  |
| Dibasic Acid, Neut. No | 699 | 748 | 731 |
| Dibasic Acid Yield, Wt. Percent (Based on Water Soluble Oxidate) | 88 | 85 | 87 |
| Nitric Acid Consumption (Parts $HNO_3$ Consumed/Parts Dibasic Acid Produced) | 0.6 | 0.7 | 0.9 |
| Analysis of Dibasic Acid Product: |  |  |  |
| Succinic | 26 | 25 | 26 |
| Glutaric | 14 | 13 | 15 |
| Adipic | 13 | 13 | 11 |
| Pimelic | 8.3 | 7.4 | 8.8 |
| Suberic | } 11.1 | 9.9 | 9.9 |
| Azelaic | | | |
| Others | 27.6 | 31.7 | 28.3 |

The following example demonstrates the applicability of our process to paraffinic hydrocarbons other than paraffin waxes.

*Example IV*

1000 parts of a paraffinic lube oil oxidate, prepared by air blowing the paraffinic lube oil of SAE 8 grade having the following properties:

Gravity, ° API _____ 30.5-32.5
Flash, COC, ° F. _____ 400
Viscosity, SUS:
   At 100° F. _____ 145
   At 210° F. _____ 42.7
Viscosity index _____ 95
Pour, ° F. _____ 0 in the presence of potassium permanganate, said oxidate fraction having a Neut. No. of 315, a Sap. No. of 448 and an unsaponifiable content of 6.7% was charged to a 3 neck Pyrex flask equipped with a stirrer, thermometer, reflux condenser and stopcock at its bottom together with 1100 parts of water. Stirring was started and the charge was heated to 167° F. for one hour under autogenous pressure. Subsequently, the reaction mixture was cooled and allowed to stand overnight to effect separation of the aqueous and organic layers. The lower aqueous phase was drawn off through the stopcock. When the water was stripped off from the aqueous layer under a reduced pressure of 15-50 mm. Hg absolute utilizing a boiling water (212° F.) bath as the heat source, a dark viscous oil remained which was the water soluble fraction of lube oil oxidate. This water soluble fraction amounted to 19.3% of the total lube oil oxidate and had a Neut. No. of 417 and a Sap. No. of 646. The organic raffinate layer had a Neut. No. of 146 and a Sap. No. of 362.

To a stainless steel steam heated autoclave, there was charged 52 parts of the above water soluble extract, 74 parts of concentrated (70.1%) nitric acid and 264 parts of water which established a 15% nitric acid concentration (based on $HNO_3$ and $H_2O$). Stirring was started and the autoclave was heated at between 300 and 305° F. for a period of one hour during which time the pressure rose to 500 p.s.i.g. The reactor was cooled to room temperature and the resultant gases were bled off through a caustic trap. The reaction mixture was passed through an ion exchange column filled with the hydrogen form of Amberlite IR-120 ion exchange resin to remove metallic cations, the crude dibasic acids were separated from the aqueous phase by distilling off the water and nitric acid at a reduced pressure of between 15 and 50 mm. Hg absolute employing a boiling water (212° F.) bath. A gummy mixture of dibasic acids were left having a Neut. No. of 589. The yield of dibasic acid was 75% based on the water soluble oxidate charge.

The following example demonstrates a further embodiment of our invention. This example demonstrates the combination of a vanadate and copper catalyst to substantially increase the relative yield of succinic acid.

*Example V*

The reaction condition ingredients and ingredient amounts were identical to those of Run 3 in Example III except in the third stage of the process, i.e., the nitric acid oxidation 0.003 part of ammonium vanadate and 0.003 part of powdered copper per part water soluble oxidate was introduced into the reaction mixture. A crude dibasic product having a Neut. No. of 773 was recovered in the yield of 85% based on the water soluble fraction of the air oxidate. Analyses of the product found it to contain 37% succinic acid, 15% glutaric acid, 12% adipic acid, 7.6% pimelic acid, 6.9% suberic acid and azelaic acid and 21.5% dibasic acids having greater than 9 carbon atoms.

A comparison of the above product analysis with that of Run 3 in Example III showed the employment of a vanadate-copper catalyst combination increased the yield of succinic acid by almost 50%. Succinic acid is an important basic ingredient in the manufacture of many pharmaceutical preparations among other things.

Obviously, many modifications and variations of this invention as hereinbefore set forth may be made without departing from the spirit and scope thereof and therefore, only such limitations should be imposed as are indicated in the appended claims.

We claim:

1. A process for the production of dibasic acids which comprises oxidizing a macrocrystalline paraffin wax with oxygen until the resultant reaction mixture has a saponification number of at least 200 thereby forming a paraffinic wax oxidate, mixing said paraffinic wax oxidate with water under temperature and pressure sufficient to maintain the resultant mixture substantially in the liquid state, separating the aqueous and the non-aqueous fractions of said resultant mixture from one another, forming a reaction mixture by contacting said aqueous fraction at a pressure between about atmospheric and 800 p.s.i.g. and at a temperature between about 120 and 400° F. with nitric acid having an initial $HNO_3$ concentration of between about 5 and 40% based on the water and $HNO_3$ content thereof, and subsequently separating the dibasic acids from said reaction mixture.

2. A process in accordance with claim 1 wherein said saponification number is from 300 to 600.

3. A process in accordance with claim 1 wherein said mixing is conducted at a temperature between about 100 and 500° F.

4. A process in accordance with claim 1 wherein said mixing is conducted at a pressure between about atmospheric and 1000 p.s.i.g.

5. A process in accordance with claim 1 wherein the ratio of the water to said paraffinic wax oxidate is from 0.1:1 to about 10:1.

6. A process in accordance with claim 1 wherein said separation of said aqueous fraction from said resultant mixture is a gravity separation.

7. A process in accordance with claim 1 wherein said initial concentration of nitric acid is between 15 and 40% and wherein the initial ratio of water soluble portion of said paraffinic wax oxidate to $HNO_3$ in said reaction mixture is between 5:1 and 1:10.

8. A process in accordance with claim 1 wherein a catalyst combination of copper and a vanadate are incorporated in said aqueous fraction, said vanadate selected from the group consisting of alkali metal vanadate and ammonium vanadate.

9. A process in accordance with claim 11 wherein said copper is present in said aqueous fraction in an amount between 0.05 and 3% and wherein said vanadate is present in said aqueous fraction in an amount between 0.05 and 3% based on the water soluble portion of the paraffinic wax oxidate.

10. A process in accordance with claim 1 wherein a dibasic acid fraction is recovered from said nitric reaction mixture by the extraction thereof with a higher alkanol of 4 to 18 carbon atoms.

11. A process in accordance with claim 10 wherein said alkanol is isooctanol used in 1 to 4 volumes per volume of said aqueous fraction.

12. A process for the production of dibasic acids which comprises oxidizing a macrocrystalline paraffin wax with air until the resultant reaction mixture has a saponification number between 400 and 600, thereby forming a paraffinic wax oxidate, agitating said paraffinic wax oxidate with water at a temperature between 150 and 350° F. and at a pressure between about atmospheric and 1000 p.s.i.g., said pressure sufficient to maintain the resulting aqueous mixture in a liquid state, maintaining the ratio of said water to said paraffinic wax oxidate between about 1:1 and 4:1, separating by gravity said resulting aqueous mixture into an oily fraction and an aqueous fraction, agitating said aqueous fraction with nitric acid at a temperature between 150 and 350° F. and at a pressure between about atmospheric and 800 p.s.i.g. to form a nitric acid reaction mixture, said nitric acid of an initial concentration in said reaction mixture of between 15 and 40% based on the weight of the water and 100% $HNO_3$, and the initial weight ratio of the water soluble portion of said paraffinic wax oxidate to 100% $HNO_3$ maintained between 1:1 and 1:4, subsequently distilling off the nitric acid and water components of the resultant nitric acid reaction mixture under reduced pressure at elevated temperature to obtain a residue of dibasic acids.

References Cited in the file of this patent

UNITED STATES PATENTS

| | | |
|---|---|---|
| 2,768,201 | Hill | Oct. 23, 1956 |
| 2,791,598 | Brown et al. | May 7, 1957 |
| 2,844,626 | Kamlet | July 22, 1958 |
| 2,918,487 | Patterson et al. | Dec. 22, 1959 |

FOREIGN PATENTS

| | | |
|---|---|---|
| 633,354 | Great Britain | Dec. 12, 1949 |